April 24, 1956 — F. R. BOKORNEY — 2,743,074
FRAME CONSTRUCTION FOR BALANCING MACHINE
Filed April 21, 1953 — 2 Sheets-Sheet 1
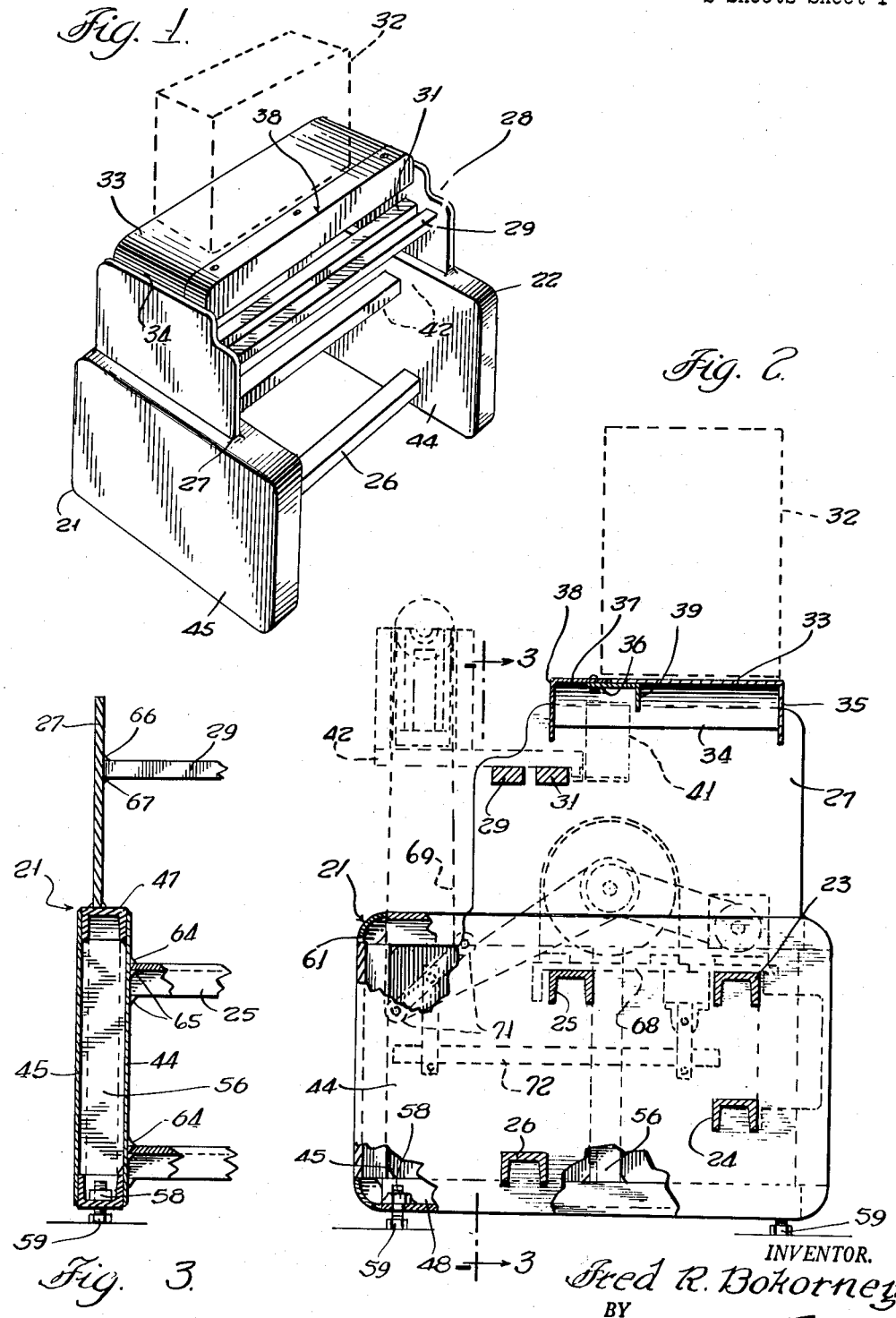
INVENTOR.
Fred R. Bokorney
BY
Attorney

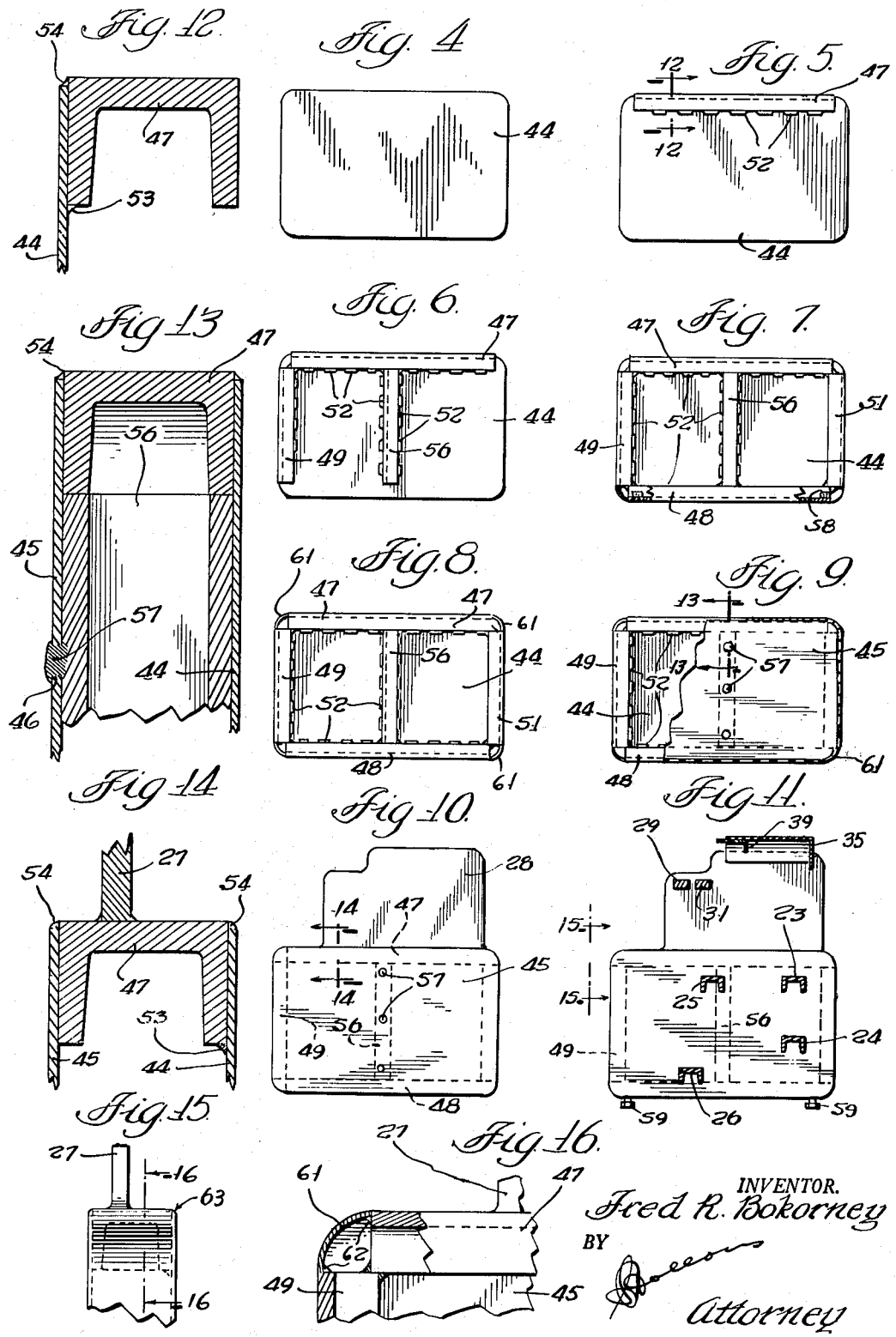

United States Patent Office 2,743,074
Patented Apr. 24, 1956

2,743,074

FRAME CONSTRUCTION FOR BALANCING MACHINE

Fred R. Bokorney, Westchester, Ill.

Application April 21, 1953, Serial No. 350,011

1 Claim. (Cl. 248—13)

The present invention relates to balancing machines and concerns itself more particularly with a frame construction therefor as well as with its method of manufacture.

In testing for unbalance in various small piece parts which perform as rotor elements, testing apparatus is required which heretofore was built of costly manufacturing parts. A major contribution toward costliness in this class of apparatus has been the methods of manufacture pertaining to the frame construction which involved costly machining operations and the use of numerous fixtures. The production of balancing machines has involved other substantial cost factors in order to achieve the necessary accuracies of its parts coupled with required stability and durability to withstand under sustained production line testing operations.

It is accordingly a principal object of the present invention to contrive a framework construction together with its methods and processes of manufacture and assembly, which shall partake of the necessary qualities of accuracy and durability while yet involving lower manufacturing costs.

Another object of the present invention is to devise a balancing machine framework which affords efficient and compact accommodations for workpiece supporting fixtures as well as rotary powering apparatus and panel board control mechanism.

Still another object of the present invention is to provide a balancing machine frame construction in which side frame members as well as transversely extending beams connecting these members are made of rolled steel integrated by welding into an aesthetically pleasing, accurate, and efficiently compact unit that is adaptable to be used with a large range of workpieces respecting length and girth dimensions, while affording the sought after advantages of close approach and accessibility for inspection and observation during placement, removal, as well as during operation.

The foregoing and other objects and advantages of the present invention may be achieved by the practice of various methods and structures which will be explained in the course of the following detailed description, having particular reference to the accompanying drawings, in which similar reference numerals designate corresponding parts throughout, and in which, Fig. 1 is a diminutive perspective view of a balancing machine utilizing a framework constructed in accordance with certain features of the invention;

Fig. 2 is a transverse sectional view on a somewhat enlarged scale of the apparatus disclosed in Fig. 1;

Fig. 3 is a fragmentary sectional view taken approximately on line 3—3 of Fig. 2;

Fig. 4 is a side elevational view of an inner side plate from which base sub-assembly is made;

Fig. 5 is a side elevational view of an inner side plate such as that illustrated in Fig. 4, showing one of the intermediate channels welded in position thereon;

Fig. 6 is a view similar to Fig. 5 showing two additional channels applied;

Fig. 7 is a view similar to Figs. 5 and 6 showing all of the intermediate channel elements in position;

Fig. 8 is a view similar to Fig. 7 showing an advanced condition of fabrication;

Fig. 9 is a view similar to Fig. 8 with both of the side plates applied, one of them being broken away to reveal interior construction;

Fig. 10 is a side elevational view of the completed side frame sub-assembly with its vertical stanchion plate welded in position;

Fig. 11 is a transverse sectional view through the completed assembly with the transversely extending beam and platform elements illustrated in section;

Fig. 12 is a fragmentary sectional detail view taken approximately on line 12—12 of Fig. 5;

Fig. 13 is a transverse detail sectional view on an enlarged scale taken approximately on line 13—13 of Fig. 9;

Fig. 14 is an enlarged detail sectional view taken approximately on line 14—14 of Fig. 10;

Fig. 15 is an enlarged end elevational view taken approximately on line 15—15 of Fig. 11; and Fig. 16 is an enlarged fragmentary sectional view taken approximately on line 16—16 of Fig. 15.

Referring now more particularly to the accompanying drawings, attention is directed to Fig. 1 wherein there is illustrated in solid lines the framework elements of a balancing machine and in dotted outline the cradle supporting fixtures and control circuit cabinet associated therewith. The framework is of integrated (preferably welded) construction and includes a pair of identical but symmetrically opposite base assemblies 21 and 22 connected together by a pair of rearmost channel elements 23 and 24 and by a pair of slightly displaced foremost channels 25 and 26. Above each one of the base assemblies 21 and 22 there is welded a vertically extending stanchion plate 27 and 28. These are similarly connected together by transversely extending solid bars 29 and 31 that are utilized as machine bed rails for supporting the workpiece holding fixtures as will be generally described later.

A control cabinet indicated by the dotted outline 32 includes a face panel on which are mounted various indicating instruments. This unit serves the purpose of containing the signal amplification, stroboscopic control, and other wiring portions of a balancing machine of the class here contemplated. In order to support the electric system containing cabinet 32, the stanchion plates 27 and 28 are bridged by a sheet metal support platform 33 curvedly blending into vertical side panels 34 which may be secured as by welding to the inner surfaces of the stanchion plates.

This transverse beam may be made as a single inverted channel, although as illustrated of two parts; the rear part includes an apron back panel 35 while at its front edge is a lap strip 36 of relatively narrow width peforated to receive mount screws of a continuation panel 37. This arrangement provides a removable protective covering unit generally designated 38.

In order to improve the beam strength of a two-part platform 33, a reinforcing angle iron 39 is welded near its foremost end significantly spaced from the juncture edge so as not to interfere with the electromagnetic coil pickup units 41, Fig. 2, one of which is associated with each cantilever beam 42 which constitutes a cradle supporting fixture.

Each base assembly is constructed of a pair of identically profiled side plates 44 and 45 of which the outside plate 45 is bored as at 46, Fig. 13, for a purpose which will be later revealed. Upon the inner surface of inside plate 45 there are first placed and then welded a rectangular arrangement of peripheral channels 47, 48, 49 and 51.

In order to assure accurate placement of the aforedescribed channel elements 47—51, it is advisable to utilize simple framing guide fixtures, although the matter of aligning the channel elements can be done with a square. When the components are thus placed they may be tack welded to establish the relative placement of the parts, after which the abutting surfaces are integrated by the use of intermittent fillet welds 52 applied as at 53 and 54, Figs 12 and 14.

In order to eliminate any possibility of vibrational or drum effects from developing in the base assemblies the panel plates 44 and 45 are advantageously damped by the use of intermediate bulkhead sections 56 which are similarly secured by intermittent tack welding, see Fig. 8. In the prefered manner of application all of the channel elements 47—51 are placed so that their webs are external and coincide with or preferably extend a slight distance beyond the edges of plates 44 and 45.

When the base assemblies approach completion, that is to say, when all of the perimetric and bulkhead channels have been welded into position and the outside panels 45 are ready to be applied, a similar technique is followed, but in this case because of the closure only the external weld spots 54 may be reached so that accordingly transverse stiffening is accomplished by locating plug welds 57, Figs. 10 and 13, through the holes 46 prepared in the outside plates and against the sides of the bulkhead or other channel elements.

Before the bottom longitudinal channel 48 is welded to the inside plate 44, holes are drilled and tapped near its opposite ends, or in lieu of tapping, threaded nut elements 58 are welded at the inner surfaces of the channel base panel in registration with the holes. In this way an accommodation is made for the reception of leveling bolts 59 serving as pedestals which have screw-thread engagement with the integrated nut elements 58. By turning these members until each sustains its load share, leveling adjustment is accomplished regardless of the floor conditions in which the machine may be required to stand.

In this way there is provided a totally fabricated steel framework of sturdy and durable construction which is also efficently weighted and in which the vital supporting parts are accurately manufactured with regard to dimensional tolerances and parallelism without involving excessive costs in machine tool equipment, fixtures, and what is generally considered to be costlier processing machinery for manufacture. If additional weighting is found to be necessary, the entire space within the base enclosure may be filled as with cement before sealing.

The stanchion plates 27 and 28 are held in aligning fixtures preparatory to welding so as to be perpendicular to the outer edge of the web of channel members 47 when welded into position as illustrated in Fig. 14. This securement is made by fillet welds as in the case of the base assembly. The upper corners of the stanchion plates 27 and 28 are preferably rounded and following the completion of the previously described welding operations, the completed end frames including the stanchion plates and base assemblies, are finished off by a filling-in of all of the spaces which intervene the intermittent weld spots and the corner voids at 54 with commercially available putty and filler. Because the surface of rolled steel parts is manifestly smoother than that of castings, surface filling is reduced to a minimum.

Thereafter the end frames may be undercoated and painted to accomplish aesthetically pleasing and decorative effects while increasing the resulting strength and utility and within keeping of a price range respecting cost which is favorably competitive with heretofore known methods of producing similar equipment.

One of the important features pertaining to attractiveness is believed to be the attainment of rectangular general lines coupled with convex curvtures at the prominent corners. In connection with the stanchion plates, these effects are produced by a simple profiling operation, as has already been indicated. In reference to the base assemblies, however, the achievement of parallelism and conformity in this respect is produced by a practice of butt-welding curved corner pieces 61 to contiguous channel members through the expedient of butt-welding juncture as at 63, Fig. 16. These corner pieces may then have radii common with the filleted curvatures of plates 44 and 45. At the circumferential corners formed between the corner pieces 61 and the corner curvatures of plates 44 and 45, there may be applied a single concave filleting weld following which the residual hollows may be filled in convexly by the use of putty and filler built up to afford minute convex external corner filleting at best indicated in the corners designated 63, Fig. 15.

When the two end frames have been completed they may be joined together by means of the already described transversely extending beam channels 23—26 and the stanchion plates by the transversely extending bed rails 29 and 31, and for this purpose an aligning fixture is utilized which holds the two end frames in true parallelism and transverse alignment.

All of the transverse beam elements which include channels and solids are accurately cut to size and held in position for welding. Securement is achieved by the use of fillet T-joint welds as at 64 and 65, Fig. 3, respecting the channel beams 23—26 and by similar welding technique as at 66 and 67 respecting the solid bar bed rails 29 and 31. In this way the entire framework is integrated into a rigid durable whole abundantly bolstered to withstand all manner of strain forces to which the apparatus may become subjected by reason of the cantilever beams 42 or by reason of the motor unit base plate 68, Fig. 2.

During the use of the balancing machine and in order to avail of wide flexibility respecting the testing of different sized rotors, the cantilever beam elements 42 are adjusted in a lateral sense across the solid bed rail members 29 and 31. The driving belt element 69 together with its idler pulley arrangement 71 and support rigging 72, are also laterally adjustable together with the motor supporting base 68 in relationship to the transverse channel bars 23 and 25.

Accordingly, true parallelism of the transverse beam members is an essential attribute toward successful flexibility in adjustment. In the practice of the described methods and apparatus, the requisite degree of accuracy is maintained. The resulting product is a lighter weighed fabrication of equal or at least adequate strength coupled with superior aesthetics.

While the present invention has been explained and described with reference to a specifically disclosed embodiment, it will be understood nevertheless that various changes and modifications are susceptible of being made without departure from its essential scope. Accordingly, it is not intended to be limited by the particular language of the foregoing description, nor by the detailed illustrations in the accompanying drawings, except as indicated in the hereinafter appended claim.

What is claimed is:

A support structure for balancing machines which comprises, a pair of opposite and symmetrical side frames, each of said side frames comprising a base portion and an upright stanchion plate, each base portion including lengths of horizontal and vertical structural channel members arranged to form the rectangular perimetric boundary of each of said base portions with the channel legs thereof directed inwardly, bulkhead channel members located intermediate said perimetric boundary forming channel members, inner and outer side plates enclosing the base portions fillet-welded to the perimetric boundary forming channel legs and plug-welded to said bulkhead channel members for thereby achieving vibrationfree integration of said inner side plates, each of said upright stanchion plates having a lowermost edge perpendicularly fillet-welded to the base web of the uppermost one of its related base portion horizontal channel lengths, a pair of transversely extending work fixture supporting bars welded to and connecting together the stanchion plates of said opposite side frames, and a plurality of power mechanism supporting channels welded to and connecting together the inner side plates of said base portions.

References Cited in the file of this patent

UNITED STATES PATENTS

| | | |
|---|---|---|
| 1,623,565 | Thimgren | Apr. 5, 1927 |
| 1,931,118 | Rowland | Oct. 17, 1933 |
| 2,325,083 | Tautz | July 27, 1943 |
| 2,348,043 | Webb et al. | May 2, 1944 |
| 2,568,783 | Woodruff | Sept. 25, 1951 |
| 2,594,581 | Phelps | Apr. 29, 1952 |
| 2,599,170 | Franks | June 3, 1952 |
| 2,644,652 | Hannay | July 7, 1953 |

FOREIGN PATENTS

| | | |
|---|---|---|
| 55,077 | Norway | Apr. 8, 1935 |